(12) United States Patent
Moreno et al.

(10) Patent No.: US 9,016,663 B2
(45) Date of Patent: Apr. 28, 2015

(54) SOLENOID-ACTUATED PRESSURE CONTROL VALVE

(75) Inventors: Alejandro Moreno, El Paso, TX (US); Francisco Morales, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 236 days.

(21) Appl. No.: 13/401,927

(22) Filed: Feb. 22, 2012

(65) Prior Publication Data

US 2013/0214187 A1 Aug. 22, 2013

(51) Int. Cl.
*F16K 31/02* (2006.01)
*F16K 31/06* (2006.01)
*H01F 7/08* (2006.01)

(52) U.S. Cl.
CPC ......... *F16K 31/0655* (2013.01); *F16K 31/0665* (2013.01); *H01F 2007/085* (2013.01)

(58) Field of Classification Search
CPC . F16K 31/0655; F16K 31/0665; H01F 7/081; H01F 2007/085
USPC ............ 251/129.14, 129.15; 335/281, 278
See application file for complete search history.

(56) References Cited

U.S. PATENT DOCUMENTS

| | | | |
|---|---|---|---|
| 3,588,039 A * | 6/1971 | Chelminski | 251/129.15 |
| 5,076,323 A | 12/1991 | Schudt | |
| 5,608,369 A * | 3/1997 | Irgens et al. | 335/281 |
| 6,206,343 B1 * | 3/2001 | Kato et al. | 251/129.15 |
| 6,328,065 B1 | 12/2001 | Schmid et al. | |
| 6,880,570 B2 | 4/2005 | Moreno et al. | |
| 7,458,395 B2 * | 12/2008 | Haynes et al. | 137/625.65 |
| 7,973,627 B2 * | 7/2011 | Yamagata et al. | 335/255 |
| 8,109,487 B2 * | 2/2012 | Kokubu et al. | 251/129.15 |
| 8,387,947 B2 * | 3/2013 | Uemura et al. | 251/129.19 |
| 2002/0113219 A1 * | 8/2002 | Rembold et al. | 251/129.14 |
| 2007/0138422 A1 | 6/2007 | Najmolhoda et al. | |
| 2008/0203340 A1 | 8/2008 | Moreno et al. | |
| 2008/0216899 A1 * | 9/2008 | Moreno et al. | 137/219 |
| 2009/0140189 A1 * | 6/2009 | Kokubu et al. | 251/129.15 |
| 2011/0073791 A1 * | 3/2011 | Oikawa | 251/129.15 |
| 2012/0199771 A1 * | 8/2012 | Kasagi et al. | 251/129.15 |

FOREIGN PATENT DOCUMENTS

JP WO 2011/052371 A1 * 5/2011 .............. F16K 31/06

* cited by examiner

*Primary Examiner* — Matthew W Jellett
(74) *Attorney, Agent, or Firm* — Thomas N. Twomey

(57) ABSTRACT

A valve assembly includes a hydraulic subassembly with a valve member displaceable along a valve axis for controlling flow of fluid. The valve assembly also includes a solenoid subassembly for selectively displacing said valve member. The solenoid subassembly includes a metallic solenoid housing having an open end and a solenoid housing base. The solenoid subassembly also includes a solenoid coil assembly disposed within the solenoid housing, the solenoid coil assembly having a coil wound around a plastic spool defining a spool bore extending through the spool. The solenoid subassembly also includes a metallic solenoid housing cover closing off the open end of the solenoid housing and attached to the solenoid housing with a crimp connection. The solenoid subassembly also includes a metallic column disposed within and passing through the spool bore extending from the solenoid housing base to the solenoid housing cover.

18 Claims, 3 Drawing Sheets

SOLENOID-ACTUATED PRESSURE CONTROL VALVE

TECHNICAL FIELD OF INVENTION

The present invention relates to a solenoid-actuated control valve; more particularly to a solenoid-actuated control valve which is resistant to pressure drift over time; and even more particularly to a solenoid-actuated control valve which does not place crimp assembly loads on plastic components within the solenoid.

BACKGROUND OF INVENTION

Solenoid-actuated control valves, herein after referred to as control valves, are well known to control the flow and/or pressure of a fluid. In many applications, it may be desirable that the flow and/or pressure output of the control valve be proportional to an electric current supplied to a solenoid of the control valve. In a common control valve arrangement, the electric current supplied to the solenoid of the control valve affects the position of a supply valve member and/or an exhaust valve member relative to a supply valve seat and an exhaust valve seat respectively. The position of the supply valve member relative to the supply valve seat and/or the position of the exhaust valve member relative to the exhaust valve seat affects the fluid flow and/or pressure leaving the control valve. It is therefore important that the position of the valve members relative to the valve seats for a given electric current supplied to the solenoid does not change during the life of the control valve because if the position of the valve members relative to the valve seats is not as is expected, the flow and/or pressure leaving the control valve may not be the desired magnitude.

The solenoid of the control valve is typically enclosed in a housing that is cylindrical and made of metal. An example of such a control valve is shown in US Patent Application Publication No. US 2007/0138422 A1. During manufacturing of the control valve, at least one end of the housing is open to allow components of the solenoid to be placed within the housing. After all of the components have been placed within the housings, a cover may be placed over the open end, and the housing may be crimped or folded over the cover to retain the cover to the housing. When the housing is crimped to retain the cover, an axial load is placed on the components within the housing and the axial load on the components within the housing is maintained by the crimp connection. However, this axial load from the crimp is known to be transmitted through plastic components, such as the spool (also known as a bobbin or coil former) around which the coil of the solenoid is wound. Over time, this crimp load may cause the plastic components to creep (i.e. change in shape and position), thereby changing the position of the valve members relative to the valve seats for a given a given electric current supplied to the solenoid. As a result, the desired flow and/or pressure leaving the control valve may not be the desired magnitude for a given electric current supplied to the solenoid.

One way to address the effects of creep of the plastic components and the changing of position of the valve members relative to the valve seats over time is to use closed loop feedback. In this arrangement, the actual flow and/or pressure leaving the control valve is measured with a sensor. The sensor sends a signal indicative of the flow and/or pressure to a controller. If the signal indicates that the flow and/or pressure is not the desired magnitude, the controller can alter the electric current supplied to the solenoid until the desired flow and/or pressure reaches the desired magnitude. In this way, the effects of creep of plastic components can be overcome. However, using closed loop feedback increases the cost and complexity of the system, for example by the addition of sensors, wiring, and software.

What is needed is a control valve in which the flow and/or pressure leaving the control valve does not change over time for a given magnitude of electric current used to actuate the control valve. What is also needed is a control valve which is not affected by creeping of plastic components of the solenoid over time.

SUMMARY OF THE INVENTION

Briefly described, a valve assembly includes a hydraulic subassembly with a valve member displaceable along a valve axis for controlling at least one of flow and pressure of fluid from a fluid source to a working device. The valve assembly also includes a solenoid subassembly for selectively displacing the valve member. The solenoid subassembly includes a metallic solenoid housing having an open end distal from the hydraulic subassembly and a solenoid housing base adjacent to and connected with the hydraulic subassembly. The solenoid subassembly also includes a solenoid coil assembly disposed within the solenoid housing, the solenoid coil assembly having a coil wound around a plastic spool defining a spool bore extending through the spool. The solenoid subassembly also includes a solenoid housing cover closing off the open end of the solenoid housing and attached to the solenoid housing with a crimp connection that creates a compressive crimp force acting along the valve axis. The solenoid subassembly also includes a metallic column disposed within and passing through the spool bore, the metallic column extending from the solenoid housing base to the solenoid housing cover. The compressive crimp forces are transferred through the metallic column from the solenoid housing base to the solenoid housing cover to isolate the compressive crimp forces from plastic components.

BRIEF DESCRIPTION OF DRAWINGS

This invention will be further described with reference to the accompanying drawings in which.

DETAILED DESCRIPTION OF INVENTION

Figure 1:
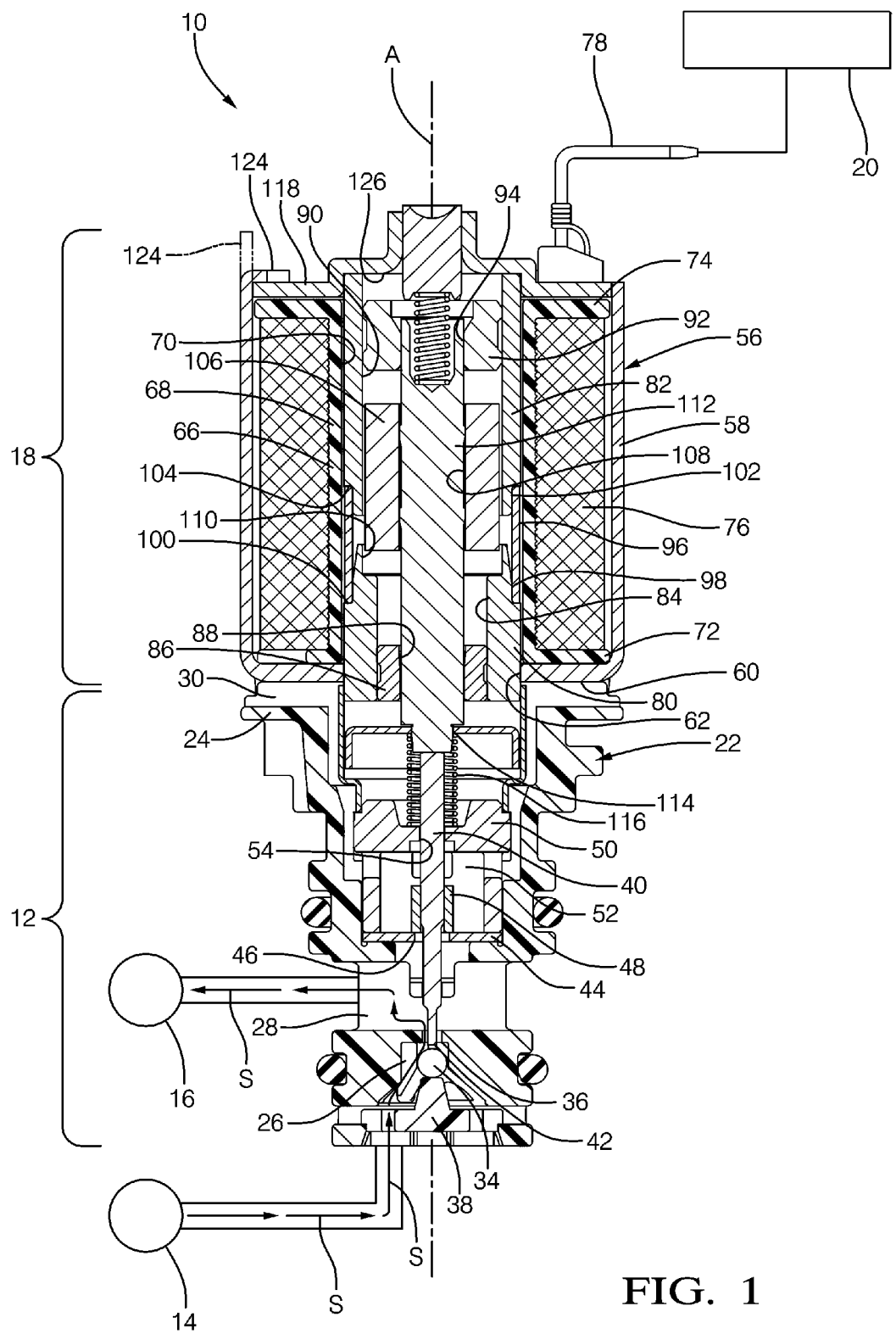
FIG. 1 is a cross section of a valve assembly in accordance with the invention shown in a position which allows full pressure and/or flow from a fluid source to a working device.

In accordance with a preferred embodiment of this invention and referring to FIGS. 1 and 2, solenoid-actuated control valve 10 is shown, hereinafter referred to as valve assembly 10. Valve assembly 10 includes hydraulic subassembly 12 in fluid communication with fluid source 14 and working device 16. Working device 16 may be, for example, a transmission clutch. Valve assembly 10 also includes solenoid subassembly 18 which is connected to hydraulic subassembly 12 and which controls the fluid communication from fluid source 14 through hydraulic subassembly 12 to working device 16 based on an electric current which is variable and which is supplied by electric current source 20. Electric current source 20 may be, for example, an electronic controller.

Hydraulic subassembly 12 includes hydraulic subassembly housing 22 which may be made, for example, by injection molding a plastic material. Hydraulic subassembly housing 22 extends along valve axis A and includes attachment flange 24 at one axial end which is used to attach hydraulic subassembly 12 to solenoid subassembly 18. Hydraulic subassembly housing 22 also includes inlet port 26 located in the axial end of hydraulic subassembly housing 22 which is distal from attachment flange 24. Inlet port 26 is in constant fluid communication with fluid source 14. Hydraulic subassembly housing 22 also includes working port 28 extending radially outward from hydraulic subassembly housing 22. Working port 28 is in constant fluid communication with working device 16 and is in variable fluid communication with inlet port 26 based on input from solenoid subassembly 18. Hydraulic subassembly housing 22 also includes exhaust port 30 which is in variable fluid communication with working port 28 based on input from solenoid subassembly 18.

Hydraulic subassembly 12 also includes a supply valve member shown as ball 34 which is located within inlet port 26 and which is selectively seated and unseated with supply valve seat 36. Supply valve seat 36 is annular, coaxial with valve axis A, and formed between working port 28 and inlet port 26 to be small in diameter than ball 34. In order to retain ball 34 within inlet port 26, ball retainer 38 may be provided. Ball retainer 38 may be secured, for example by press fit or welding, within an enlarged portion of inlet port 26. A reduced diameter section of ball retainer 38 may extend further into inlet port 26 to prevent ball 34 from escaping inlet port 26 while still allowing for axial movement of ball 34 relative to supply valve seat 36 to allow for desired flow and/or pressure from fluid source 14 to working device 16 when ball 34 is not seated with supply valve seat 36.

Hydraulic subassembly 12 is also provided with poppet rod 40 in order transfer linear motion produced by solenoid subassembly 18 to ball 34 to selectively seat and unseat ball 34 with supply valve seat 36. Poppet rod 40 is coaxial with valve axis A and sized to extend through supply valve seat 36 such that a clearance is formed radially outward of poppet rod 40 to allow fluid communication radially between hydraulic subassembly housing 22 and poppet rod 40 from inlet port 26 to working port 28 when ball 34 is unseated with supply valve seat 36. When ball 34 is to be unseated with supply valve seat 36, poppet rod tip 42 contacts ball 34 and urges ball 34 away from supply valve seat 36.

Hydraulic subassembly 12 is also provided with exhaust seat 44 which is disposed within hydraulic subassembly housing 22 axially between working port 28 and exhaust port 30. Exhaust seat 44 is substantially disk-shaped and includes exhaust aperture 46 extending axially therethrough and coaxial with valve axis A. Exhaust aperture 46 is sized to allow poppet rod 40 to pass therethrough with sufficient radial clearance with poppet rod 40 to allow fluid communication radially between exhaust aperture 46 and poppet rod 40 from working port 28 to exhaust port 30. Exhaust valve member 48 is fixed to poppet rod 40 and sized to be larger in diameter than exhaust aperture 46. Poppet rod 40 is moveable based on input from solenoid subassembly 18 to allow exhaust valve member 48 to be selectively seated and unseated with exhaust seat 44. In this way, fluid communication from working port 28 to exhaust port 30 is substantially prevented when exhaust valve member 48 is seated with exhaust seat 44. Conversely, fluid communication from working port 28 to exhaust port 30 is permitted when exhaust valve member 48 is not seated with exhaust seat 44. It should also be noted that fluid communication from inlet port 26 to working port 28 is permitted when exhaust valve member 48 is seated with exhaust seat 44 and that fluid communication from inlet port 26 to working port 28 is substantially prevented for a portion of the travel of poppet rod 40 in which exhaust valve member 48 is not seated with exhaust seat 44.

Hydraulic subassembly 12 is also provided with exhaust seat retainer 50 for retaining exhaust seat 44 within hydraulic subassembly housing 22 and for guiding poppet rod 40. Exhaust seat retainer 50 captures exhaust seat 44 axially between a shoulder within hydraulic subassembly housing 22 and the axial end of exhaust seat retainer 50 that is distal from solenoid subassembly 18. Exhaust seat retainer 50 is press fit or otherwise fastened within hydraulic subassembly housing 22 to prevent relative movement between exhaust seat retainer 50 and hydraulic subassembly housing 22, thereby retaining exhaust seat 44 within hydraulic subassembly housing 22. Exhaust seat retainer 50 is cup-shaped to define exhaust chamber 52 radially outward of poppet rod 40/exhaust valve member 48 which allows axial movement of exhaust valve member 48 within exhaust chamber 52. Exhaust seat retainer 50 includes exhaust seat retainer aperture 54 extending axially therethrough and coaxial with valve axis A. Exhaust seat retainer aperture 54 is sized to be a clearance fit with poppet rod 40 such that poppet rod 40 is able to move axially substantially uninhibited while radial movement of poppet rod 40 is substantially prevented.

Solenoid subassembly 18 includes solenoid housing 56 which is made of a magnetic metal. Solenoid housing 56 includes a substantially cylindrical section defining solenoid housing sidewall 58. Solenoid housing 56 also includes solenoid housing base 60 which extends radially inward from solenoid housing sidewall 58 to partially close the end of solenoid housing 56 which is proximal to hydraulic subassembly 12. Solenoid housing base 60 may be constructed as one piece with solenoid housing sidewall 58, for example by a metal stamping process. Solenoid housing base 60 defines solenoid housing aperture 62 extending axially through solenoid housing base 60 coaxial with valve axis A. Solenoid housing 56 also includes attachment tabs 64 which are used to retain hydraulic subassembly 12 to solenoid subassembly 18. Attachment tabs 64 extend axially from solenoid housing sidewall 58 toward hydraulic subassembly 12. In FIG. 2, attachment tabs 64 are shown as phantom lines as they appear after being crimped or folded over attachment flange 24 of hydraulic subassembly housing 22 in order to retain hydraulic subassembly 12 to solenoid subassembly 18. Attachment tabs 64 are also shown in FIG. 2 as solid lines as they would appear prior to attachment tabs 64 being crimped over to attach hydraulic subassembly 12 to solenoid subassembly 18.

Solenoid subassembly 18 also includes spool 66 which is made of a material which does not conduct electricity, for example, plastic. Spool 66 includes spool cylinder 68 which is coaxial with valve axis A and spool bore 70 which extends axially through spool cylinder 68 coaxial with valve axis A. Spool 66 also includes spool rims 72, 74 which extend radially outward from the ends of spool cylinder 68. Spool rim 72 extends radially outward from the end of spool cylinder 68 which is proximal to solenoid housing base 60 while spool rim 74 extends radially outward from the end of spool cylinder 68 which is distal from solenoid housing base 60. Electrically conductive wire is wound around spool cylinder 68 between spool rims 72, 74 to form coil 76 which is connected to terminals 78 which are connected to electric current source 20. Spool 66 and coil 76 together define a solenoid coil assembly.

Solenoid subassembly 18 also includes primary pole piece 80 and secondary pole piece 82 which are each made of a magnetic material. Primary pole piece 80 and secondary pole piece 82 are sized to fit within spool bore 70 such that primary pole piece 80 and secondary pole piece 82 may be inserted within spool bore 70 without restriction. Primary pole piece 80 may be disposed proximal to solenoid housing base 60 while secondary pole piece 82 may be disposed distal from solenoid housing base 60. It should be noted that primary pole piece 80 and secondary pole piece 82 are part of the magnetic circuit of solenoid subassembly 80 which function to control the magnetic flux distribution.

Primary pole piece 80 includes primary pole piece bore 84 which extends axially through primary pole piece 80 coaxial with valve axis A. Primary pole piece bushing 86 is fixed within primary pole piece bore 84, for example, by press fit. Primary pole piece bushing 86 is made of a non-magnetic material, for example, bronze or plastic and includes primary pole piece bushing bore 88 which extends axially through primary pole piece bushing 86 coaxial with valve axis A. Primary pole piece 80 is fixed to solenoid housing base 60, for example, by press fit within solenoid housing aperture 62.

Secondary pole piece 82 includes secondary pole piece bore 90 which extends axially through secondary pole piece 82 coaxial with valve axis A. Secondary pole piece bushing 92 is fixed within secondary pole piece bore 90, for example, by press fit. Secondary pole piece bushing 92 is made of a non-magnetic material, for example, bronze or plastic and includes secondary pole piece bushing bore 94 which extends axially through secondary pole piece bushing 92 coaxial with valve axis A.

Primary pole piece 80 may be fixed to secondary pole piece 82 with alignment ring 96. Alignment ring 96 is cylindrical and made of a non-magnetic material, for example, brass or stainless steel. Alignment ring 96 is fixed to primary pole piece 80, for example, by press fit with primary pole piece reduced diameter section 98. Alignment ring 96 axially abuts primary pole piece shoulder 100 which is defined by primary pole piece reduced diameter section 98. Similarly, alignment ring 96 is fixed to secondary pole piece 82, for example, by press fit with secondary pole piece reduced diameter section 102. Alignment ring 96 axially abuts secondary pole piece shoulder 104 which is defined by secondary pole piece reduced diameter section 102. Alignment ring 96 is sized to fit within spool bore 70 such that alignment ring 96 may be inserted within spool bore 70 without restriction. Alignment ring 96 is also sized to axially space primary pole piece 80 from secondary pole piece 82.

Solenoid subassembly 18 also includes armature 106 which is at least partly disposed within secondary pole piece bore 90 in a clearance fit such that armature 106 is able to slide within secondary pole piece bore 90 without restriction and such that radial movement of armature 106 within secondary pole piece bore 90 is substantially prevented. Armature 106 is made of a magnetic material and includes armature bore 108 which extends axially through armature 106 and coaxial with valve axis A. Armature 106 may also be partially received within enlarged section 110 of primary pole piece bore 84. Enlarged section 110 is sized to allow unrestricted movement of armature 106 within enlarged section 110. The axial position of armature 106 along valve axis A is variable based on electric current supplied to coil 76 by electric current source 20.

Solenoid subassembly 18 also includes connecting rod 112 which is received within primary pole piece bushing bore 88, secondary pole piece bushing bore 94, and armature bore 108 coaxial with valve axis A. Connecting rod 112 is sized to form a slip fit with primary pole piece bushing bore 88 and secondary pole piece bushing bore 94 such that connecting rod 112 is able to move axially without restriction and such that radial movement of connecting rod 112 is substantially prevented. Connecting rod 112 is fixed to armature 106, for example by press fit or staking such that connecting rod 112 moves axially with armature 106 as a single unit. Connecting rod 112 includes rod spring seat 114 which is formed by a reduced diameter end of connecting rod 112 that is proximal to hydraulic subassembly 12. The end of connecting rod 112 that is proximal to hydraulic subassembly 12 is fixed to poppet rod 40. In this way, axial movement of armature 106/connecting rod 112 is translated to axial movement of poppet rod 40.

Return spring 116 radially surrounds a portion of poppet rod 40 and a portion of connecting rod 112. Return spring 116 is disposed axially between exhaust seat retainer 50 and rod spring seat 114 to bias poppet rod 40/connecting rod 112/armature 106 away from hydraulic subassembly 12.

Solenoid subassembly 18 also includes solenoid housing cover 118 made of a magnetic metal for closing the end of solenoid housing 56 which is distal from solenoid housing base 60. Solenoid housing cover 118 includes alignment tabs 120 that extend radially outward from solenoid housing cover 118. Alignment tabs 120 fit within solenoid housing notches 122 formed in solenoid housing sidewall 58 of solenoid housing 56 (only one solenoid housing notch 122 is visible in FIG. 2). Attachment tabs 124 extend axially away from solenoid housing sidewall 58 to define solenoid housing notches 122. In FIG. 1, attachment tab 124 is shown as a solid line as it appears after assembly and being crimped (i.e. folded over) to retain solenoid housing cover 118. Also in FIG. 1, attachment tab 124 is shown as a phantom line as it would appear prior to the folding or crimping operation. In FIG. 2, attachment tabs 124 are shown only as they would appear prior to the folding or crimping operation. Solenoid housing cover 118 includes recessed section 126 which may be formed, for example, by a stamping operation. Recessed section 126 is formed with a diameter to receive a portion of secondary pole piece 82 therewithin.

After attachment tabs 124 have been crimped to retain solenoid housing cover 118, an compressive crimp load exists on solenoid housing cover 118 along valve axis A. This crimp load is counteracted at the outer edge of solenoid housing cover 118 by solenoid housing sidewall 58. This crimp load is also counteracted radially inward of the outer edge of solenoid housing cover 118 by a metallic column which may be formed by the combination of primary pole piece 80, alignment ring 96, and secondary pole piece 82. It should be noted that if primary pole piece 80 is attached to solenoid housing base 60 by a press fit within solenoid housing aperture 62, the force required to move primary pole piece 80 relative to solenoid housing base 60 must be greater than the axial force acting on primary pole piece 80/alignment ring 96/secondary pole piece 82 as a result of attachment tabs 124 being crimped over to retain solenoid housing cover 118. In this way, the crimp load is isolated from plastic components and consequently the crimp load is not supported by any plastic components which could creep over time due to the crimp load. Creep of plastic parts over time due to the crimp load may cause a change in the position over time of poppet rod 40/connecting rod 112/armature 106 for a given electric current applied to coil 76 compared to the position of poppet rod 40/connecting rod 112/armature 106 at the same given electric current applied to coil 76 when valve assembly 10 is first manufactured.

When electric current source 20 applies an electric current of sufficient magnitude to coil 76, a magnetic field is generated through a magnetic circuit which includes primary pole piece 80, armature 106, secondary pole piece 82, solenoid housing cover 118, and solenoid housing 56. The magnetic field creates an attractive force between armature 106 and primary pole piece 80, thereby causing armature 106 to move toward primary pole piece 80 and compressing return spring 116. The magnitude that armature 106 moves may be proportional to the magnitude of electric current applied to coil 76 in order to precisely control the axial position of armature 106. When the electric current applied to coil 76 is decreased or stopped, return spring 116 urges armature 106 in the upward direction as viewed in FIG. 1.

Figure 2:
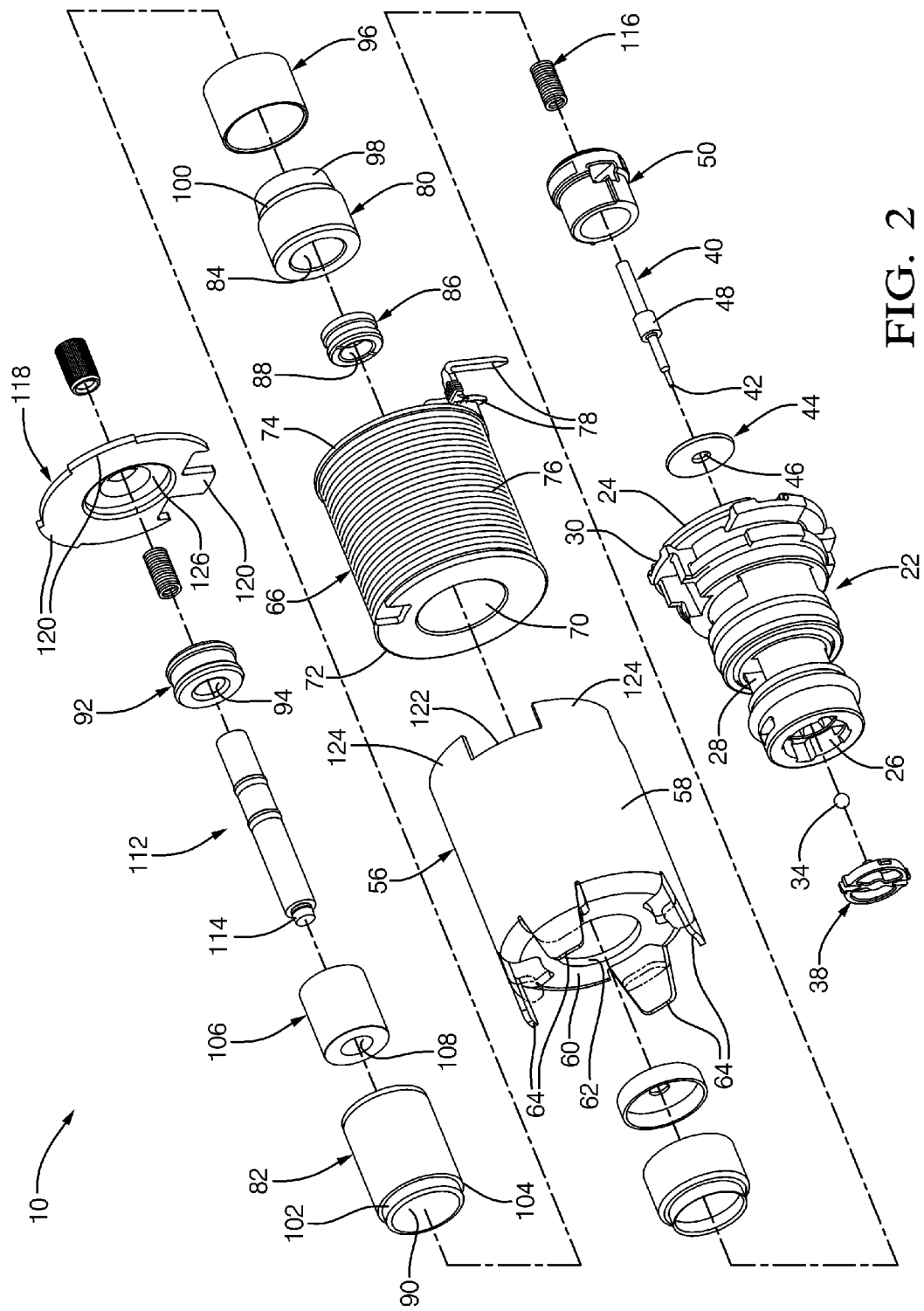
FIG. 2 is an exploded isometric view of the valve assembly of FIG. 1.

In operation and referring to FIG. 1, valve assembly 10 is shown in an operational state in which maximum flow and/or pressure is permitted to be supplied from fluid source 14 to working device 16. This is accomplished by electric current source 20 applying a current to coil 76 sufficient to axially move armature 106/poppet rod 40/connecting rod 112 until exhaust valve member 48 contacts exhaust seat 44. When this occurs, return spring 116 is compressed and ball 34 is unseated with supply valve seat 36 by poppet rod tip 42. Ball 34 may be moved further away from supply valve seat 36 by fluid from fluid source 14 until ball 34 contacts ball retainer 38. In this way, the maximum amount of flow and/or pressure of the fluid from fluid source 14 is applied to working device 16. Arrows S are used to illustrate the pressure and/or flow fluid supplied by fluid source 14.

Figure 3:
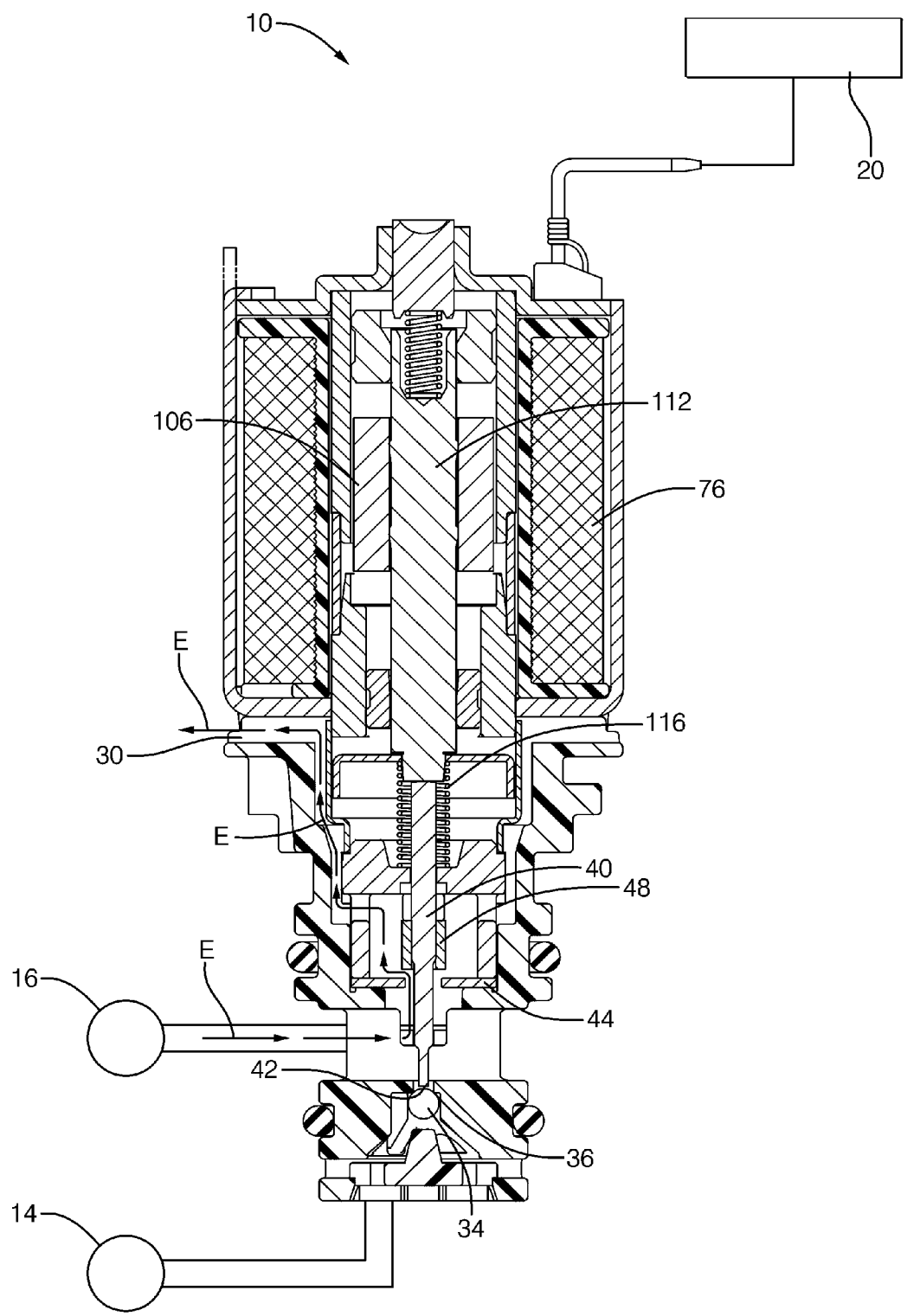
FIG. 3 is the cross section of FIG. 1 now with the valve assembly shown in a position which prevents fluid communication from the fluid source to the working device.

In operation an now referring to FIG. 3 valve assembly 10 is shown in an operational state in which flow and pressure is prevented from being supplied from fluid source 14 to working device 16. This is accomplished by stopping electric current source 20 from applying a current to coil 76 or decreasing the current to a magnitude such that return spring 116 axially urges armature 106/poppet rod 40/connecting rod 112 to a position that prevents poppet rod tip 42 from interfering with ball 34 from seating with supply valve seat 36. When this occurs, exhaust valve member 48 is lifted from exhaust seat 44 to allow fluid to exit valve assembly 10 through exhaust port 30. This allows ball 34 to seat against supply valve seat 36 by the flow and/or pressure of fluid from fluid source 14, thereby preventing fluid communication from fluid source 14 to working device 16. Arrows E are used to illustrate the exhaust of fluid from working device 16 to exhaust port 30.

While not shown, it should now be understood that electric current source 20 may apply a current to coil 76 sufficient to axially move armature 106/poppet rod 40/connecting rod 112 to positions that are intermediate of the positions shown in FIGS. 1 and 3. This allows some flow and/or pressure of fluid from fluid source 14 to escape to exhaust port 30 in order to decrease the flow and/or pressure of fluid supplied to working device 16, thereby achieving a desired flow and/or pressure of fluid to working device 16.

Valve assembly 10 has been illustrated as preventing fluid communication from fluid source 14 to working device 16 when coil 76 is not supplied with an electric current and has also been illustrated as preventing fluid communication from working device 16 to exhaust port 30 when a maximum electric current is applied to coil 76 which is commonly referred to as a "normally low" valve because the default operation (i.e. no electric current) of valve assembly 10 results in low flow and/or pressure to working device. It should now be understood that valve assembly 10 may also be configured to be a "normally high" valve by reversing the positions of primary pole piece 80 and secondary pole piece 82 and repositioning return spring 116 to urge poppet rod 40/armature 106/connecting rod 112 toward hydraulic subassembly 12. This arrangement would make the default operation (i.e. no electric current) to allow maximum flow and/or pressure of fluid to working device 16 from fluid source 14.

While solenoid subassembly 18 has been shown in the context of actuating a valve, it should now be understood that the use of solenoid subassembly 18 need not be limited to actuating valves, but may be used in other applications where linear motion generated by a solenoid is commonly used. It this way, the magnitude of linear motion produced by solenoid assembly 18 may be precisely controlled over time for a given electric current since creeping of plastic components within solenoid assembly 18 due to crimp forces is eliminated.

While this invention has been described in terms of preferred embodiments thereof, it is not intended to be so limited, but rather only to the extent set forth in the claims that follow.

We claim:

1. A valve assembly having a hydraulic subassembly with a valve member displaceable along a valve axis for controlling at least one of flow and pressure of fluid from a fluid source to a working device, said valve assembly also having a solenoid subassembly for selectively displacing said valve member, said solenoid subassembly comprising:
    a metallic solenoid housing having an open end distal from said hydraulic subassembly and a solenoid housing base adjacent to and connected with said hydraulic subassembly;
    a solenoid coil assembly disposed within said solenoid housing, said solenoid coil assembly having a coil wound around a plastic spool defining a spool bore extending through said spool;
    a metallic solenoid housing cover closing off said open end of said solenoid housing and attached to said solenoid housing with a crimp connection that creates a compressive crimp force acting along said valve axis; and
    a metallic column disposed within and passing through said spool bore, said metallic column extending from said solenoid housing base to said solenoid housing cover;
    wherein said compressive crimp force is transferred through said metallic column from said solenoid housing base to said solenoid housing cover to isolate said compressive crimp force from plastic components.

2. A valve assembly as in claim 1 wherein said metallic column comprises:
    a primary pole piece of said solenoid subassembly; and
    a secondary pole piece of said solenoid subassembly.

3. A valve assembly as in claim 2 wherein said metallic column further comprises an alignment ring disposed axially between said primary pole piece and said secondary pole piece.

4. A valve assembly as in claim 3 wherein said primary pole piece and said secondary pole piece are each connected to said alignment ring with a press fit connection.

5. A valve assembly as in claim 3 wherein said primary pole piece and said secondary pole piece are each made of a magnetic metal and wherein said alignment ring is made of a non-magnetic metal.

6. A valve assembly as in claim 3 wherein said primary pole piece and said secondary pole piece are each part of the magnetic circuit of said solenoid subassembly.

7. A valve assembly as in claim 1 wherein said solenoid housing base includes a solenoid housing base aperture extending therethrough and wherein said metallic column is press fit within said solenoid housing base aperture.

8. A valve assembly as in claim 1, wherein an armature is disposed within said metallic column, said armature being axially moveable in a first direction along said valve axis when said coil is energized with an electric current, said armature being axially moveable in a second direction along said valve axis that is opposite said first direction when said coil is not energized with an electric current, and wherein said armature affects the position of said valve member.

9. A valve assembly having a hydraulic subassembly with a valve member displaceable along a valve axis for controlling flow of fluid from a fluid source to a working device, said valve assembly also having a solenoid subassembly for selectively displacing said valve member, said solenoid subassembly comprising:
   a metallic solenoid housing having an open end distal from said hydraulic subassembly and a solenoid housing base adjacent to and connected with said hydraulic subassembly;
   a solenoid coil assembly disposed within said solenoid housing, said solenoid coil assembly having a coil wound around a plastic spool defining a spool bore extending through said spool;
   a metallic solenoid housing cover closing off said open end of said solenoid housing and attached to said solenoid housing with a crimp connection that creates a compressive crimp force acting along said valve axis; and
   a metallic column defined by a primary pole piece made of a magnetic metal, a secondary pole piece made of a magnetic metal, and an alignment ring made of a non-magnetic metal disposed between said primary pole piece and said secondary pole piece.

10. A valve assembly as in claim 9 wherein said metallic column is in compression between said solenoid housing base and said solenoid housing cover.

11. A solenoid subassembly extending along a valve axis, said solenoid subassembly comprising:
   a metallic solenoid housing having an open end and a solenoid housing base opposing said open end;
   a solenoid coil assembly disposed within said solenoid housing, said solenoid coil assembly having a coil wound around a plastic spool defining a spool bore extending through said spool;
   a metallic solenoid housing cover closing off said open end of said solenoid housing and attached to said solenoid housing with a crimp connection that creates a compressive crimp force acting along said valve axis; and
   a metallic column disposed within and passing through said spool bore, said metallic column extending from said solenoid housing base to said solenoid housing cover;
   wherein said compressive crimp force is transferred through said metallic column from said solenoid housing base to said solenoid housing cover to isolate said compressive crimp force from plastic components.

12. A solenoid subassembly as in claim 11 wherein said metallic column comprises:
   a primary pole piece of said solenoid subassembly; and
   a secondary pole piece of said solenoid subassembly.

13. A solenoid subassembly as in claim 12 wherein said metallic column further comprises an alignment ring disposed axially between said primary pole piece and said secondary pole piece.

14. A solenoid subassembly as in claim 13 wherein said primary pole piece and said secondary pole piece are each connected to said alignment ring with a press fit connection.

15. A solenoid subassembly as in claim 13 wherein said primary pole piece and said secondary pole piece are each made of a magnetic metal and wherein said alignment ring is made of a non-magnetic metal.

16. A solenoid subassembly as in claim 13 wherein said primary pole piece and said secondary pole piece are each part of the magnetic circuit of said solenoid subassembly.

17. A solenoid subassembly as in claim 11 wherein said solenoid housing base includes a solenoid housing base aperture extending therethrough and wherein said metallic column is press fit within said solenoid housing base aperture.

18. A solenoid subassembly as in claim 11, wherein an armature is disposed within said metallic column, said armature being axially moveable in a first direction along said valve axis when said coil is energized with an electric current and said armature being axially moveable in a second direction along said valve axis that is opposite said first direction when said coil is not energized with an electric current.

* * * * *